July 9, 1957 H. A. DAVIS 2,798,990
ELECTRICAL CAPACITORS
Filed Nov. 22, 1952
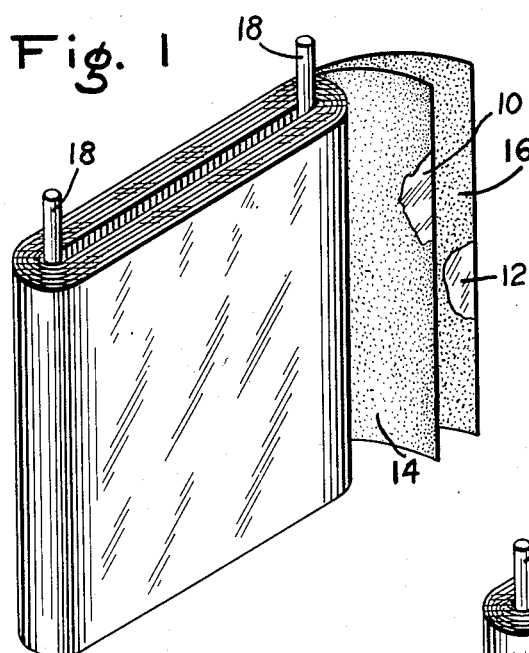
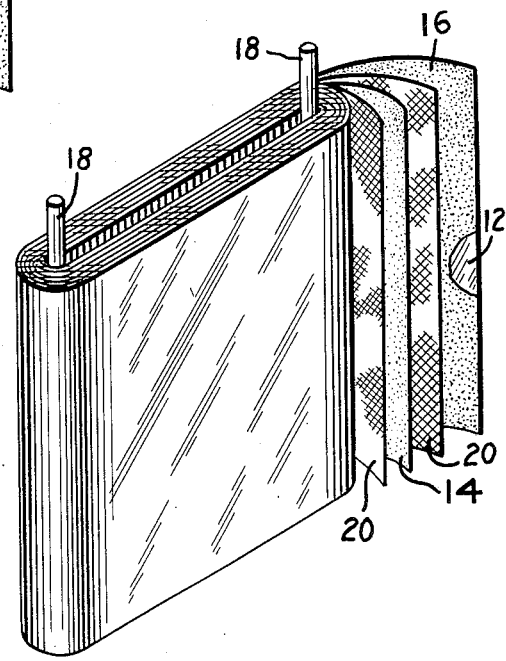
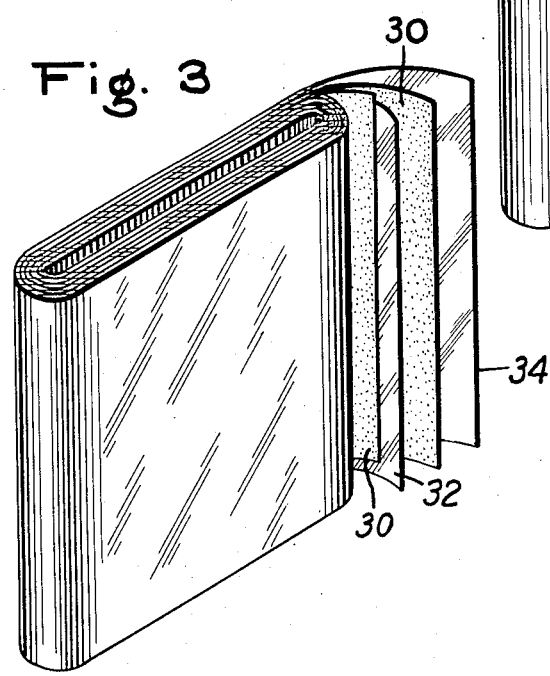
INVENTOR.
HOWARD A. DAVIS
BY
HIS ATTORNEYS

2,798,990
ELECTRICAL CAPACITORS

Howard A. Davis, Williamstown, Mass., assignor to Sprague Electric Company, North Adams, Mass., a corporation of Massachusetts Application November 22, 1952, Serial No. 322,163

6 Claims. (Cl. 317—258)

This invention relates to new and improved electrode constructions and electrical capacitors.

For many years the entire capacitor industry has been involved in a relentless search for new and improved dielectric materials which can be satisfactorily employed in capacitance units. The lack of effectiveness of this search is indicated by the fact that it still goes on today with undiminished vigor. A satisfactory dielectric material for small wound capacitance units not only must be cheap, possess excellent physical properties, such as resistance to abrasion, strength, etc., but must also possess advantageous electrical properties such as, for example, high dielectric constant, high leakage resistance, good power factor, and the like. Also for many applications, capacitor dielectrics must be capable of being obtained in extremely thin uniform films.

It is an object of the present invention to produce coated electrodes and electrical capacitors having extremely desirable physical and electrical properties. A further object of the invention is to produce electrical capacitance units which can be conveniently manufactured at a reasonable cost. These and other objects of the invention, as well as the advantages of it, will be apparent from this specification and the appended claims.

According to the teachings of this specification, the above objects are obtained by the use of an amylose dielectric film. In one of its embodiments, the invention is concerned with the use of electrode foils coated with a firmly adherent, thin, uniform, homogeneous amylose dielectric layer. In a further preferred embodiment of the invention, this layer is placed upon a slightly etched aluminum foil.

For the sake of brevity, the terms amylose and amylose films used herein are intended to refer to films composed predominantly of amylose. The term amylose is intended to include any substantially linear amylaceous polysaccharide compound composed of anhydroglucose units joined predominantly by alpha 1,4-glucosidic linkages. Thus the term includes the amylose which can be separated from the common starches by well-known methods, such as Meyer hot water extraction procedure, or the alcohol precipitation procedure of Schoch.

The advantages of amylose as a dielectric material arise primarily from its density, its ability to form a uniform homogeneous sheet substantially free from flaws, and its ability to be formed in almost any desired thickness in a firmly adherent layer directly upon a metal foil. The tendency to form corona in voids adjacent to the electrodes with such films is almost completely eliminated with this dielectric, and as a result the practical working voltage capacitors using this material is high. Also the D. C. leakage across the dielectric amylose films of the invention is substantially negligible. Other advantages of amylose dielectrics are contrasted for purpose of comparison with certain other common dielectrics. Cellophane, which is a regenerated cellulose product, contains traces of salts from the solution in which it has been regenerated. Impurities of this nature are not found in amylose, and hence, the corrosion, etc., resulting from their presence are not found when amylose dielectrics are employed. Also, the new films of the invention have substantially all of the advantages of the pure materials which go into paper and similar dielectrics, but represent an improvement over such materials because of the uniform, homogeneous character.

The production of the individual dielectric films of this invention may be carried out as indicated in U. S. Patent No. 2,608,723, issued September 2, 1952, and in the co-pending Davis et al. applications, Serial Nos. 128,901, filed November 22, 1949 now Patent 2,656,571, and 247,742, filed September 21, 1951. It is to be understood that this invention does not relate to the production of these films per se, but instead is concerned with the use of an amylose dielectric layer in conjunction with electrode foils.

When the amylose dielectric films are to be permanently attached to the electrode foils in accordance with the preferred teachings of the invention, these films can vary from a thickness of about 10 Angstron units to about 30 microns in thickness without any special precautions being involved in the manufacture. Thicker adherent films can also be obtained. However, with such thicker films it is advantageous to employ dielectric sheets which are separate from the electrode foils. In general, the thickness of usable separate dielectric films is greater than 20 microns, although self-supporting films as thin as 10 microns in thickness have been created. The maximum thickness for satisfactory separate dielectric films of the indicated variety is about 1/16 of an inch.

Because oily contamination of the electrode foils to be coated with adherent amylose films markedly reduces the adhesion of these films to their foils, it is advantageous to utilize these films with aluminum or other metal electrodes which have been thoroughly degreased so as to present a hydrophilic surface to the deposited amylose. Adherent films, however, are preferably formed upon slightly etched or roughened aluminum. Oxidized aluminum, and other metals such as zinc, silver, tantalum, and the like, can also be coated. If desired, the pores of a so-called fabricated plate capacitor can be filled with a very adherent amylose coating.

The drawing appended herewith consists of the following figures: Fig. 1, illustrates an electrical capacitor in which the electrodes are coated with the dielectric of the invention; Fig. 2 illustrates a further capacitor structure in which a porous spacer is associated with the dielectric of the invention and; Fig. 3 portrays self-supporting films of amylose as the dielectric of an extended foil capacitor.

Inasmuch as the present application is not concerned with production of amylose and amylose films per se, the following examples are given solely for purposes of illustration, so as to enable those skilled in the art to obtain capacitors corresponding to the present disclosure.

Example I

A 250 ml. flask containing 150 ml. of water was heated in an electric mantle. When the water reached about 90° C. a slurry of 10.0 g. of amylose in 20 ml. of n-butanol was poured into the vigorously stirred water, stirring and heating under reflux for 20 minutes. The water-butanol azeotrope was distilled off, continuing distillation until 90 ml. of distillate had been collected, leaving a clear 10% solution, or dispersion, of amylose in water. The hot solution was filtered through a hot fritted-glass funnel with very light suction. The filter flask, loosely stoppered to minimize evaporation, was kept hot (above 85° C.) without boiling, until the solution was cast into film.

The clear amylose solution was poured onto clean, unetched aluminum foil 0.3 mil thick and promptly drawn down with a doctor blade arrangement set for 0.015 in. clearance between the foil and the blade. The foil and blade were held at 54°–60° C. during casting and the freshly cast films dried at a temperature of 60°–80° C.

under an initially large but gradually decreasing relative humidity. After gradual cooling to room temperature there was obtained a smooth, flexible, transparent coating, about 0.015 to 0.020 mm. in thickness.

*Example II*

A solution of corn amylose (92% amylose and 8% amylopectin) was prepared by adding 25 g. to 285 ml. of water at 80°–85° C. containing 37½ ml. butanol. The mixture was refluxed with stirring for 10 minutes after which water-butanol azeotrope was distilled until 72 ml. of the distillate had been collected. The solution was filtered hot through a fritted glass disc to free it from foreign matter, then an elongated etched aluminum foil 0.3 mils thick having an etch ratio of 1.5 was coated with this solution by being passed through it for a period of four seconds at a velocity of two feet per minute.

This coating was dried by passage through a vertical, electrically-heated tunnel in which an internal temperature of 70°–80° was maintained.

*Example III*

Two foils 10 and 12 coated on one side with amylose shown as 14 and 16, prepared as in Example I above were wound together into electrical capacitance units one of which is illustrated in Fig. 1. Appropriate tabs 18 were applied to these foils by insertion within the windings of the section.

*Example IV*

A capacitor illustrated in Fig. 2 was prepared as in Example III, but with a layer of 0.2 mil kraft condenser paper 20 incorporated adjacent to each amylose-coated surface 14 and 16. The unit was then impregnated with a hydrocarbon dielectric fluid.

*Example V*

Two foils coated on both sides as in Example II above were wound into a capacitance unit. Appropriate tabs were attached to the opposed foils by moistening and scraping away part of the dielectric layer adjacent to each of the foils.

*Example VI*

A capacitor was prepared by winding two foils, each coated with amylose on both sides and edges as in Example II, with alternate layers of kraft capacitor paper. Tabs were laid in at appropriate places, the foils being exposed by moistening and scraping away strips of the amylose coatings. The unit was subsequently impregnated with a chlorinated hydrocarbon inhibited against decomposition.

*Example VII*

A hot amylose solution prepared as in Example II above was cast while hot upon a chrome-plated endless belt at room temperature and distributed upon this belt using a doctor blade approximately 0.030 inches above the belt surface. This film was dried at 60°–70° C. to transparent film. This film, indicated at 30 in Fig. 3 which had a tensile strength of about 8 kg./mm.$^2$, was stripped, slitted to a standard width, and convolutely wound into an "extended foil" condenser using 0.25 mil aluminum foil 32 and 34 in accordance with standard condenser manufacturing procedures, using the projecting ends of the electrode foils as terminals.

It is to be realized that the actual films employed with the invention can be created in a great many ways besides the means specifically indicated above. They may be produced by dipping, spraying, by the use of application rolls and other devices. A hot amylose solution can even be applied to electrode foils in specific patterns by the use of printing methods such as silk screens. If desired, various sections of the uncoated foils can be masked during coating processes, or alternatively, only parts of these foils can be coated. The formation of tabs of the electrode foils of the invention can follow any of a number of procedures known to the art, such as, for example, the insertion of tabs within the windings of electrode foils which have been coated upon one side, or soldering to exposed portions of electrode foils, or scraping away part of the dielectric layers from electrode foils, and then inserting tabs, soldering, etc.

Paper and paper-like materials, whether of natural fibers such as cellulose or asbestos, or of man-made fibers such as rayon or glass, can be used conveniently in conjunction with amylose films, self-supporting or coated on the electrode foils, to provide a means of access for the impregnating fluids which are used to fill air spaces and prevent corona in capacitors. Amylose films can be filled with lamellar inorganic materials as mica and glass platelets or with high dielectric constant particles as barium titanate for specialized dielectric use.

The new capacitance units of the invention can be impregnated with any of the common dielectric impregnants employed today, such as mineral oil, chlorinated hydrocarbons, waxes, castor oil, and various sundry organic polymers used in conjunction with other known dielectric materials. They can also be encased in either cardboard, metal, or resin casings utilizing any of the normal procedures; and conventional metallizing techniques can be employed to creat electrode foils upon either self-supporting films of the invention or upon the "open" surface of amylose films supported by such means as a metal foil matrix.

It is contemplated that the broad teaching of the invention can be extended to the production of amylose spacers for electrolytic capacitors by incorporating various conducting ingredients within amylose films by such means as placing conductive salts, bases, or acids, and if desired, plasticizers or other ingredients such as ethylene glycol within amylose solutions prior to the casting of these films, or by soaking preformed amylose films within conductive ingredients.

As many widely different embodiments of my invention may be made without departing from the spirit and scope hereof, it is to be understood that my invention is not limited to the specific embodiments hereof except as defined in the appended claims.

What is claimed is:

1. In an electrical assembly, a capacitor electrode member coated with a firmly adherent dielectric film consisting essentially of amylose.

2. A capacitor comprising at least two electrodes separated by a relatively thin film consisting essentially of amylose.

3. The capacitor of claim 2 impregnated with a dielectric.

4. The capacitor of claim 2 wherein said amylose film is filled with dielectric particles.

5. A capacitor comprising at least two electrodes, a relatively thin amylose film adjacent each electrode, said films being positioned between said electrodes, and a porous dielectric spacer between said films.

6. The capacitor of claim 4 wherein said films are impregnated with a hydrocarbon dielectric fluid.

References Cited in the file of this patent

UNITED STATES PATENTS

| 2,307,488 | Clark | Jan. 5, 1943 |
| 2,342,522 | Barnard | Feb. 22, 1944 |
| 2,394,670 | Detrick | Feb. 12, 1946 |
| 2,416,892 | Barnard et al. | Mar. 4, 1947 |

FOREIGN PATENTS

| 467,608 | Great Britain | June 21, 1937 |
| 605,859 | Great Britain | Aug. 3, 1948 |

OTHER REFERENCES

Hackh's Chemical Dictionary, 3rd edition, page 802, 1944.

Whistler et al.: Ind. and Eng. Ch. (1944), vol. 36, pp. 796–798.